United States Patent [19]
Bird et al.
[11] 4,163,750
[45] Aug. 7, 1979

[54] PROCESS FOR THE HYDROGENATION OF A VEGETABLE OIL

[75] Inventors: Alfred J. Bird, Hounslow; Timothy M. Priestley, Twickenham; John M. Winterbottom, Solihull, all of England

[73] Assignee: Johnson, Matthey & Co., Limited, London, England

[21] Appl. No.: 767,483

[22] Filed: Feb. 10, 1977

[30] Foreign Application Priority Data

Feb. 11, 1976 [GB] United Kingdom ................. 5385/76

[51] Int. Cl.$^2$ .......................... C11C 3/12; B01J 21/18

[52] U.S. Cl. .................................. 260/409; 252/447; 252/465; 252/466 PT; 252/472

[58] Field of Search ......................................... 260/409

[56] References Cited

U.S. PATENT DOCUMENTS

| | | | |
|---|---|---|---|
| 1,275,405 | 8/1918 | Dewar et al. | 260/409 |
| 1,390,687 | 9/1921 | Ellis | 260/409 |
| 2,437,705 | 3/1948 | Patersen | 260/409 |
| 2,948,742 | 8/1960 | Zajcew | 260/409 |
| 3,687,989 | 8/1972 | Baltes | 260/409 |
| 3,782,904 | 1/1974 | Fletcher | 260/409 X |
| 3,847,989 | 11/1974 | Platz et al. | 260/409 X |

*Primary Examiner*—John Niebling
*Attorney, Agent, or Firm*—Cushman, Darby & Cushman

[57] ABSTRACT

This invention relates to the catalytic hydrogenation of edible oils of animal and vegetable origin. Catalytic hydrogenation according to the invention improves the keeping qualities of such edible oils without impairing their nutritional value or edibility. This is achieved by selectively hydrogenating the triply unsaturated forms of the fatty acids contained in the oil to doubly unsaturated forms using a supported catalyst. The catalyst used contains one or more of the metals Fe, Co, Ni and the platinum group metals and the support may be of extended surface or particulate form, for example, C, stainless steel, ceramics and Fe—Cr—Al—Y alloys.

8 Claims, No Drawings

PROCESS FOR THE HYDROGENATION OF A VEGETABLE OIL

This invention relates to the catalytic hydrogenation of edible oils of animal and vegetable origin. More particularly, the invention is concerned with the catalytic hydrogenation of such oils so as to improve their keeping qualities without at the same time impairing their nutritional value or edibility.

Animal and vegetable oils consist essentially of triglycerides with smaller proportions of mono- and diglycerides, that is, of esters of the trihydric alcohol glycerol with long chain fatty acids. Triglycerides may be represented by the general formula:

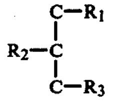

where $R_1$, $R_2$ and $R_3$ are the same or different long chain fatty acids. These may range in complexity from acids containing 12 carbon atoms in the chain (that is, $C_{12}$ acids) to those containing 30 atoms (that is, $C_{30}$ acids). Nutritionally, the most important of these acids are those containing 18 carbon atoms and these may contain 3, 2, 1 or 0 double bonds and may be characterised respectively as:

Linolenic acid $C_{183}$
Linoleic acid $C_{182}$
Oleic acid $C_{181}$
Stearic acid $C_{180}$ It is considered that, of these acids, it is the doubly-unsaturated linoleic acid which is the most important component in food for human consumption.

Typical sources of vegetable oil, wherein the preponderant acids are $C_{18}$ acids, are the soya bean, rape seed, sunflower, safflower and the palm and palm kernel. Examples of edible animal oils which may contain $C_{18}$ acids are those from such fish as the herring, pilchard, and anchovey and also from beef tallow and pig fat.

In recent years oils of vegetable origin have become increasingly important both as foods in their own right, as the components of manufactured foods and particularly as frying oils.

A disadvantage of these oils, however, is that in the "raw" state they have relatively poor keeping qualities. They fairly readily oxidise and become rancid due to the formation of impurities, such as aldehydes, for example, and it is linolenic acid containing three double bonds which is particularly prone to oxidation.

In order to lengthen the keeping qualities or shelf life of such an oil under ordinary conditions, it is desirable to eliminate the triply unsaturated forms of acid. This elimination is conveniently done by selectively hydrogenating the triply unsaturated from to the doubly unsaturated form, a process which at the moment is generally carried out with the use of a catalyst consisting, for example, essentially of nickel in admixture with or associated with minor proportions of extenders, promoters and the like. Unfortunately, the conventional nickel catalyst used has several disadvantages.

One disadvantage of a conventional nickel catalyst is that it is less selective than desired and, as a result, the oil is partially overhydrogenated and significant proportions of $C_{181}$ and $C_{180}$ acids are produced. For example, the iodine value of pre-refined soya bean oil is about 130–140 but after hydrogenation has typically fallen to about 90–95, indicating a far higher degree of saturation in the hydrogenated product than is desirable.

A further disadvantage of conventional nickel catalysts is that they tend, in operation, to form soaps with the long chain constituent fatty acids of the glycerides. These soaps prolong the filtration time of the hdyrogenated oil.

A major requirement for edible oils is that a high proportion of the fatty acids must be in the cis- form in order that they may be absorbed by the human digestive system. Trans-fatty acids will pass straight through the digestive tract. Unfortunately, the trans- forms of fatty acids are thermodynamically favoured during the process of catalytic hydrogenation and unless special precautions are taken, an unacceptably high degree of cis/-trans isomerisation will occur.

It is an object of the present invention to reduce, if not avoid, the disadvantages of conventional catalysts and provide a process for producing a hydrogenated product consisting predominantly of linoleic acid and having an iodine value of not less than about 100–110, and including little or no soap. It is a further object of the invention to provide a process producing predominantly cis-fatty acids.

We have now found that the disadvantages of a conventional catalyst can, at least in part, be overcome by the use of a supported metal catalyst in which the catalyst metal comprises one or more of the metals iron, cobalt, nickel and the platinum group metals, the said catalyst metal being deposited almost entirely on the outer surfaces of the particles of the support.

According to one feature of the invention, therefore, a process for the hydrogenation of an oil derived from an animal or vegetable source so as selectively to hydrogenate the triply unsaturated forms of the fatty acids within the oil to the doubly unsaturated forms, comprises contacting the oil with hydrogen gas in the presence of a supported metallic catalyst containing one or more of the metals iron, cobalt, nickel and the platinum group metals. Preferably the catalyst metal is supported on a substrate and is deposited entirely or substantially almost entirely on the outer surface of the catalyst support. The catalyst support may be made from a ceramic or metallic material and may be in the form of an extended surface, for example a honeycomb. Alternatively the catalyst support may be in the form of particles or granules.

The supported catalyst may comprise palladium metal deposited on the outer surfaces of carbon particles which may be porous or on a stainless steel substrate. Also, it is desirable that the weight of metal should be not more than 10% of the total weight of supported catalyst.

Other supported catalysts suitable for use in the process of the present invention include alloys or mixtures set out in the following table:

| Catalyst Metal | Substrate |
|---|---|
| Ni/Pd | Si or C |
| Rh/Pt | Al or C |
| Rh/Pd | Al C |
| Co/Pt | None |
| Pd | Charcoal |
| Pd | Al |

-continued

| Catalyst Metal | Substrate |
| --- | --- |
| Pd | Stainless Steel. |

Where a substrate having an extended surface are is required a honeycomb or so called crossflow support may be used. One particularly suitable crossflow support is that sold under the Registered Trade Mark Torvex comprising a plurality of corrugated sheets of ceramic material mounted with the corrugations of one sheet transversely disposed relative to an adjacent sheet. Such a support has the advantage that the reactants in the hydrogenation process may take place under counter current flow conditions resulting in greater contact of the reactants with the catalyst.

In addition to the metallic substrates previously mentioned alloys of iron-aluminium-chromium, which may also contain yttrium may be used. Such alloys contain 0.5-12 wt % Al, 0.1-3.0 wt % Y, 0.20 wt % Cr and balance Fe. These alloys are disclosed in U.S. Pat. No. 3,298,826. Another range of Fe—Cr—Al—Y alloys contain 0.5-4 wt % Al, 0.5-3.0 wt % Y, 20.0-95.0 wt % Cr and balance Fe and these are disclosed in U.S. Pat. No. 3,027,252.

It is highly desirable for the proper functioning of the process according to the invention that the catalyst should operate under conditions of kinetic control. Under such conditions, the residence times of the oil molecules on the catalyst sites are sufficiently short that hydrogenation of the triply-unsaturated fatty acids only is promoted and double bond migration leading to cis/-trans isomerisation is discouraged. Under conditions of hydrogen mass transfer control, on the other hand, an unacceptably high proportion of the product would be fully saturated (as indicated by a low iodine value) and trans-fatty acids would predominate in the product.

An alternative way of expressing kinetic control is that the catalytic metal should not be deposited beyond that point, within each pore of the substrate, at which the migration of the hydrogen molecules begins to govern the rate of reaction.

In order to achieve kinetic control, it is important that the catalytic metal be deposited entirely, or substantially almost entirely, on the outer surface of the substrate, or of the substrate particles or granules. A condition of kinetic control may also be encouraged by vigorous agitation of the reaction mixture, by lowering the reaction temperature, by increasing the pressure of hydrogen or by a combination of any two or of all three of these parameters.

One way of carrying out the process of the invention is described in the following example, in which a palladium on carbon catalyst is used in hydrogenation of a pre-refined soya bean oil. The weight of oil taken was 100 g, the weight of catalyst was 80 mg and the reaction temperature was 100° C.

For comparison purposes, a similar run was carried out using a conventional nickel catalyst (Harshaw DM3). Again, the weight was 126 mg and the reaction temperature was 160° (the lowest temperature at which the catalyst was active.)

In both runs, hydrogen gas was bubbled at atmospheric pressure through the reaction mixture which was stirred vigorously by means of a mechanical stirrer with the blades arranged to cut the liquid surface.

The following table shows the fatty acids composition of the oil before and after each hydrogenation, all figures being weight %.

| | Palmitic acid | Stearic acid | Oleic acid | Lineleic acid | Linolenic acid |
| --- | --- | --- | --- | --- | --- |
| Before hydrogenation | 10.4 | 4.0 | 22.1 | 53.8 | 9.7 |
| Using Pd/C | 10.6 | 4.5 | 47.3 | 35.2 | 2.0 |
| Using Ni | 10.5 | 4.9 | 60.8 | 22.2 | 1.6 |

Additionally, the iodine value of the oil before hydrogenation was 138.5, after hydrogenation using Pd/C was 106.5 and after hydrogenation using a nickel catalyst was 94.7. Further, the percentage by weight of trans-fatty acids was 14 in the oil hydrogenated using Pd/C and 28 using a nickel catalyst Thus, it will be seen that, using the process of the invention, an oil containing a substantial proportion of linolenic acid may be hydrogenated so that the linolenic acid is then present in a sufficiently small quantity so that it has no adverse effect on the keeping qualities of the oil. At the same time, the amount of linoleic acid remaining is considerably greater than that quantity remaining after hydrogenating to a similar level of linolenic acid using a conventional nickel catalyst. Furthermore, the iodine value is considerably lower using the prior art process and also the reaction temperature needs to be substantially higher which, as has been seen, favours hydrogen mass transfer control rather than kinetic control.

A further advantage of the process of the invention is that, at least when the catalyst support comprises porous carbon, a substantial portion of impurities, colloidal matter and the like is removed from the reaction mixture by adsorption onto the catalyst support, thus further improving the filtration properties of the hydrogenated oil.

Although the process of the invention has been described in detail with reference to the hydrogenation of oils containing $C_{18}$ fatty acids, it is by no means so limited and would be equally applicable to the hydrogenation of naturally-occurring oils containing fatty acids of other carbon chain lengths within the range $C_{12}$-$C_{30}$ including such fatty acids in solid form.

What we claim is:

1. A process for the hydrogenation of a vegetable oil comprising a mixture of linolenic acid, linoleic acid, oleic acid and stearic acid so as selectively to hydrogenate the triply unsaturated linolenic acid within the oil to the doubly unsaturated linoleic acid, comprising contacting the oil with hydrogen gas in the presence of a catalytically effective amount of a supported metallic catalyst containing one or more of the platinum group metals under kinetic control to obtain a product in which the triply unsaturated fatty acid is substantially completely converted to only the doubly unsaturated fatty acid with substantially no trans isomerization so as to produce a product of substantially cis form, said product being predominantly linoleic and oleic acid and having an iodine content of not less than about 100-110.

2. A process according to claim 1 wherein the catalyst metal is supported on a substrate of honeycomb surface or particulate form.

3. A process according to claim 2 wherein the catalyst comprises palladium deposited on a carbon or stainless steel substrate.

4. A process according to claim 1 wherein the catalyst metal is selected from the group consisting of alloys of Ni/Pd, Co/Pt, Rh/Pt and Rh/Pd.

5. A process according to claim 4 wherein the catalytic metal is Ni/Pd alloy supported on a substrate of Si or C.

6. A process according to claim 4 wherein the catalytic metal is an Rh/Pt or Rh/Pd alloy supported on a substrate of Al or C.

7. A process according to claim 2 wherein the weight of catalytic metal is not greater than 10% of the total weight of the catalyst.

8. A process according to claim 2 wherein the catalyst substrate is an alloy of Fe—Cr—Al and Y.

* * * * *